United States Patent
Kawanishi et al.

(10) Patent No.: US 10,532,503 B2
(45) Date of Patent: Jan. 14, 2020

(54) OPTICAL FIBER RE-COATING DEVICE

(71) Applicant: Fujikura Ltd., Tokyo (JP)

(72) Inventors: Noriyuki Kawanishi, Sakura (JP); Koichi Yokota, Sakura (JP); Ryo Hasegawa, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 116 days.

(21) Appl. No.: 14/905,163

(22) PCT Filed: Oct. 3, 2014

(86) PCT No.: PCT/JP2014/076591
§ 371 (c)(1),
(2) Date: Jan. 14, 2016

(87) PCT Pub. No.: WO2016/051598
PCT Pub. Date: Apr. 7, 2016

(65) Prior Publication Data
US 2016/0221240 A1    Aug. 4, 2016

(30) Foreign Application Priority Data
Sep. 30, 2014    (JP) .................. 2014-202272

(51) Int. Cl.
*B29C 45/17*    (2006.01)
*B29D 11/00*    (2006.01)
(Continued)

(52) U.S. Cl.
CPC .......... *B29C 45/1742* (2013.01); *B29C 33/38* (2013.01); *B29C 35/0805* (2013.01);
(Continued)

(58) Field of Classification Search
CPC ............ B29C 45/1742; B29C 45/2602; B29C 45/2606; B29C 45/261; B29C 45/1744; B29D 11/00875
(Continued)

(56) References Cited

U.S. PATENT DOCUMENTS 4,743,192 A * 5/1988 Higuchi .............. B29C 45/1742
                                                                      249/102
6,240,235 B1    5/2001 Uno et al.
2003/0215195 A1    11/2003 Koike et al.

FOREIGN PATENT DOCUMENTS

EP    0 860 720 A1    8/1998
JP    03-068905 A    3/1991
(Continued)

OTHER PUBLICATIONS

Machine translation of JP06-148453, May 1994.*
(Continued)

*Primary Examiner* — Philip C Tucker
*Assistant Examiner* — Jimmy R Smith, Jr.
(74) *Attorney, Agent, or Firm* — Sughrue Mion, PLLC

(57) ABSTRACT

An optical fiber re-coating device of the invention includes an optical fiber coater that includes: a pair of glass members having grooves formed thereon; and two bases on which the respective glass members are provided, wherein at least one of the paired glass members has a cross section in a direction vertical to a mounting surface of the bases, the cross section is formed in a trapezoidal shape, the groove is provided on a short side of the trapezoidal shape, and an inclined surface of the glass member including an inclined side of the trapezoidal shape is pressed, and the glass member is thereby fixed to the base.

9 Claims, 5 Drawing Sheets

(51) Int. Cl.
  *C03C 25/106* (2018.01)
  *B29C 45/14* (2006.01)
  *B29C 45/26* (2006.01)
  *B29C 33/38* (2006.01)
  *B29C 35/08* (2006.01)
  *B29K 105/00* (2006.01)

(52) U.S. Cl.
  CPC .. *B29C 45/14065* (2013.01); *B29C 45/14549* (2013.01); *B29C 45/1744* (2013.01); *B29C 45/26* (2013.01); *B29D 11/00875* (2013.01); *C03C 25/106* (2013.01); *B29C 45/261* (2013.01); *B29C 2035/0827* (2013.01); *B29K 2105/0058* (2013.01); *B29K 2909/08* (2013.01); *B29K 2995/0027* (2013.01)

(58) Field of Classification Search
  USPC .................................................. 403/333, 334
  See application file for complete search history.

(56) References Cited

FOREIGN PATENT DOCUMENTS

| | | | | |
|---|---|---|---|---|
| JP | 03-053527 | U | | 5/1991 |
| JP | 06-148453 | A | | 5/1994 |
| JP | 06148453 | A | * | 5/1994 ........... C04B 7/1535 |
| JP | 2002-72000 | A | | 3/2002 |
| JP | 2003-89555 | A | | 3/2003 |
| JP | 2003-337247 | A | | 11/2003 |
| JP | 2004-341387 | A | | 12/2004 |
| JP | 2006-292674 | A | | 10/2006 |
| WO | 97/015850 | A1 | | 5/1997 |

OTHER PUBLICATIONS

Communication dated Mar. 17, 2017 from the European Patent Office in counterpart European application No. 14896959.5.
Office Action for 2014-202272 dated Nov. 18, 2014.
Notice of Allowance for 2014-202272 dated Jan. 20, 2015.
Communication dated Jan. 18, 2017 from the State Intellectual Property Office of the P.R.C. in counterpart Application No. 201480038749.3.

* cited by examiner

FRONT ←→ BACK

OPTICAL FIBER RE-COATING DEVICE

CROSS REFERENCE TO RELATED APPLICATIONS

This application is a National Stage of International Application No. PCT/JP2014/076591 filed Oct. 3, 2014.

TECHNICAL FIELD

The present invention relates to an optical fiber re-coating device.

This application claims priority from Japanese Patent Application No. 2014-202272 filed on Sep. 30, 2014, the contents of which are incorporated herein by reference.

BACKGROUND ART

The following Patent Document 1 discloses an injection mold for an optical fiber coating, which does not cure resin in an injection hole or the like even in the case of being irradiated with ultraviolet light, can cure the required portions of the resin, furthermore and does not incur the possibility that burrs occur due to leakage of the resin from the matching surface. The above-described injection mold is provided with a pair of mold bodies which are provided with a recessed-shaped groove that is used to sandwich an optical fiber on the matching surface and which are made of a ultraviolet light transmissive material. A ultraviolet light barrier coating is formed on both ends of the matching surface of at least one of the paired mold bodies, and an injection hole made of a ultraviolet curable resin is provided on the mold body on which ultraviolet light is blocked by the coating.

PRIOR ART DOCUMENTS

Patent Documents

[Patent Document 1]Japanese Examined Utility Model Application, First Publication No. H3-53527

SUMMARY OF INVENTION

Problems to be Solved by the Invention

However, in some cases in the aforementioned conventional art, after the ultraviolet curable resin is cured, the paired mold bodies are adhered to each other by the ultraviolet curable resin such as using an adhesive, and are attached to each other. In the case where the mold bodies are attached to each other, a considerable amount of force is necessary to remove them from each other, consequently, the paired mold bodies are screwed to the respective mounting tables which form a pair and are coupled by a hinge, the mold body is separated off by separating off the mounting table to be in an open state even in the case where, for example, the mold bodies are adhered to each other. However, in order to screw the mold body on the mounting table, it is necessary to provide threaded holes on the mold bodies. In the case where, for example, the mold bodies are formed of a glass member, if a small crack occurs by working a threaded hole on the glass member, there is a concern that the mold bodies are damaged after an open-close operation are repeated for a long time. As a method for fixing the aforementioned mounting table without providing a threaded hole on the mold body, it is conceivable that the mold body is fixed on the mounting table by pressing it from both side surfaces facing the mold bodies by a pressing mechanism provided on the above-mentioned mounting table. However, there is a problem in that warpage occurs on the mold body due to the pressure from the side surface, consequently, a gap occurs on the matching surface between the paired mold bodies, and a ultraviolet curable resin leaks therefrom to the gap.

The invention was conceived in view of the above-described circumstances and has an object thereof to be able to fix a glass member without occurrence of warpage of the glass member and without providing a threaded hole on the glass member.

Means for Solving the Problems

In order to achieve the aforementioned object, the invention adopts a first solution means which is an optical fiber re-coating device includes an optical fiber coater that cures resin and coats a coating-removed portion of an optical fiber therewith. The optical fiber coater includes: a pair of glass members having grooves formed thereon; and two bases on which the respective glass members are provided, wherein a hollow that is used to coat an optical fiber is formed by matching the grooves of the paired glass members, and wherein at least one of the paired glass members is formed in a trapezoidal shape in a cross section in a direction vertical to mounting surfaces of the bases, the groove is provided on a short side of the trapezoidal shape, and an inclined surface of the glass member including an inclined side of the trapezoidal shape is pressed, and the glass member is thereby fixed to the base.

In the above-mentioned first solution means, the invention adopts a second solution means in which each of the paired glass members is formed in a trapezoidal shape in a cross section in a direction vertical to the mounting surfaces of the bases, and an inclined surface of the glass member including an inclined side of the trapezoidal shape is pressed, and the glass member is thereby fixed to the base.

In the above-mentioned first and second solution means, the invention adopts a third solution means in which the optical fiber coater further includes a lateral pressing member that has inclined surfaces that come into surface contact with the inclined surface of the glass member, the lateral pressing member corresponds to at least one of the two inclined surfaces of the glass member, is provided on the mounting surface of the base, and is pressed against the glass member.

In the above-mentioned first and second solution means, the invention adopts a fourth solution means in which the optical fiber coater further includes a lateral pressing member that has inclined surfaces that come into surface contact with the inclined surface of the glass member, the lateral pressing member corresponds to at least one of the two inclined surfaces of the glass member, is provided on the base, and is pressed against the glass member in a direction vertical to the inclined surface of the glass member.

Effects of the Invention

According to the invention, as a result of providing an optical fiber re-coating device including an optical fiber coater that cures resin and coats a coating-removed portion of an optical fiber therewith, wherein the optical fiber coater includes: a pair of glass members having grooves formed thereon; and two bases on which the glass members are provided, wherein a hollow that is used to coat an optical fiber is formed by matching the grooves of the paired glass members, and wherein at least one of the paired glass members is formed in a trapezoidal shape in a cross section in a direction vertical to mounting surfaces of the bases, the groove is provided on a short side of the trapezoidal shape, and an inclined surface of the glass member including an inclined side of the trapezoidal shape is pressed, and the glass member is thereby fixed to the base, it is possible to fix a glass member without occurrence of warpage of the glass member and without providing a threaded hole on the glass member.

EMBODIMENTS FOR CARRYING OUT THE INVENTION

An optical fiber re-coating device A according to the embodiment is an apparatus that removes a coating (intermediate coating) of an optional intermediate portion of an optical fiber and re-coats a portion at which an optical-fiber type optical component was manufactured. Particularly, an optical fiber which is subjected to re-coating by use of the above-mentioned optical fiber re-coating device A has a cladding and a coating that coats the outer-periphery of the cladding which are concentrically formed in order from the center of an axis. Furthermore, the coating of the optical fiber is made of ultraviolet curable resins such as urethane acrylate resins, epoxy acrylate resins, polybutadiene acrylate resins, silicone acrylate resins, polyester acrylate resins.

Figure 1:
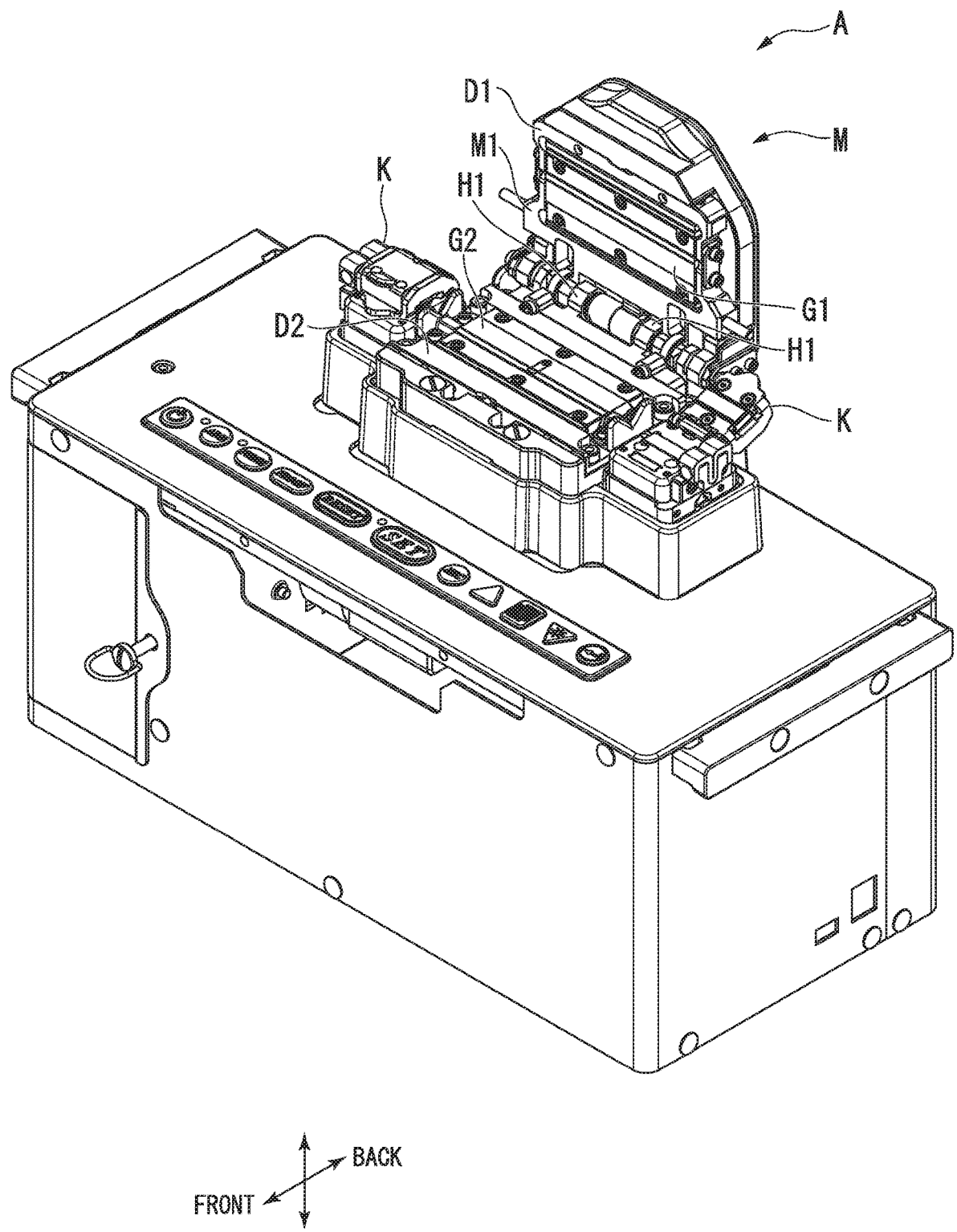
FIG. 1 is a perspective view showing an optical fiber re-coating device according to one embodiment of the invention.

As shown in FIG. 1, the above-mentioned optical fiber re-coating device A includes: an optical fiber coater M and an optical fiber holder K.

As shown in FIG. 1, the optical fiber coater M is constituted of a glass opening-and-closing unit M1 which is configured to include a pair of upper and lower forming members made of a transparent material such as a silica glass.

Glass members G1 and G2 serving as a forming member of the above-described glass opening-and-closing unit M1 include grooves G11 and G21 which are used for re-coating (refer to FIGS. 2A, 2B, 3A, and 3B) and provided at the center portions of the surfaces which are butt-jointed to each other. When glass members G1 and G2 are butt-jointed to each other, the aforementioned grooves G11 and G21 form a cavity having a substantially cylindrically-shaped air space.

At this time, the glass members G1 and G2 of the above-described glass opening-and-closing unit M1 are in a state of sandwiching the cavity therebetween at the top and bottom. In the optical fiber coater M, an upper glass member G1 is fixed on an upper mounting table D1 via an adjustment base BD (base). On the other hand, a lower glass member G2 is fixed on a lower mounting table D2 (base). Particularly, the adjustment base BD and the lower mounting table D2 are a base according to the embodiment.

The mounting table D1 is rotatably supported by a hinge H1 around the edge of the lower mounting table D2. That is, the upper glass member G1 is configured to rotate with respect to the lower glass member G2 so as to be switched between: a state of being butt-jointed to the lower glass member G2 and thereby closing the cavity; and a state of being separated from the lower glass member G2 and thereby opening the cavity.

Furthermore, a spool Sp and a gate Gt, which are used to inject a liquiform resin, that is, a pre-cured resin into the cavity and which will be described later, are provided on the lower glass member G2 of the glass opening-and-closing unit M1.

Moreover, a shielding portion made of a chrome (Cr) film is provided on the surface of the lower glass member G2 of the glass opening-and-closing unit M1 which is to be butt-jointed to the upper glass member G1 and on the portion other than the groove G21. The shielding portion is formed by coating the lower glass member G2 with chrome. The shielding portion is used so as to avoid a resin material in the spool Sp and the gate Gt, which will be described later, from being irradiated with ultraviolet light that is used to cause a resin material in the cavity to be cured. Moreover, the above-described glass opening-and-closing unit M1 will be particularly described later.

A light source (not shown in the figure) is provided in The optical fiber coater M. With respect to the optical fiber coater M, the light source irradiates, for example, the injected resin with ultraviolet light. Subsequently, the resin that is irradiated with ultraviolet light is cured.

The optical fiber holder K is used to hold an optical fiber that is in a state of being extracted from both sides of the optical fiber coater M when the optical fiber is set on the optical fiber coater M.

Next, the glass opening-and-closing unit M1 will be particularly described.

Figure 4:
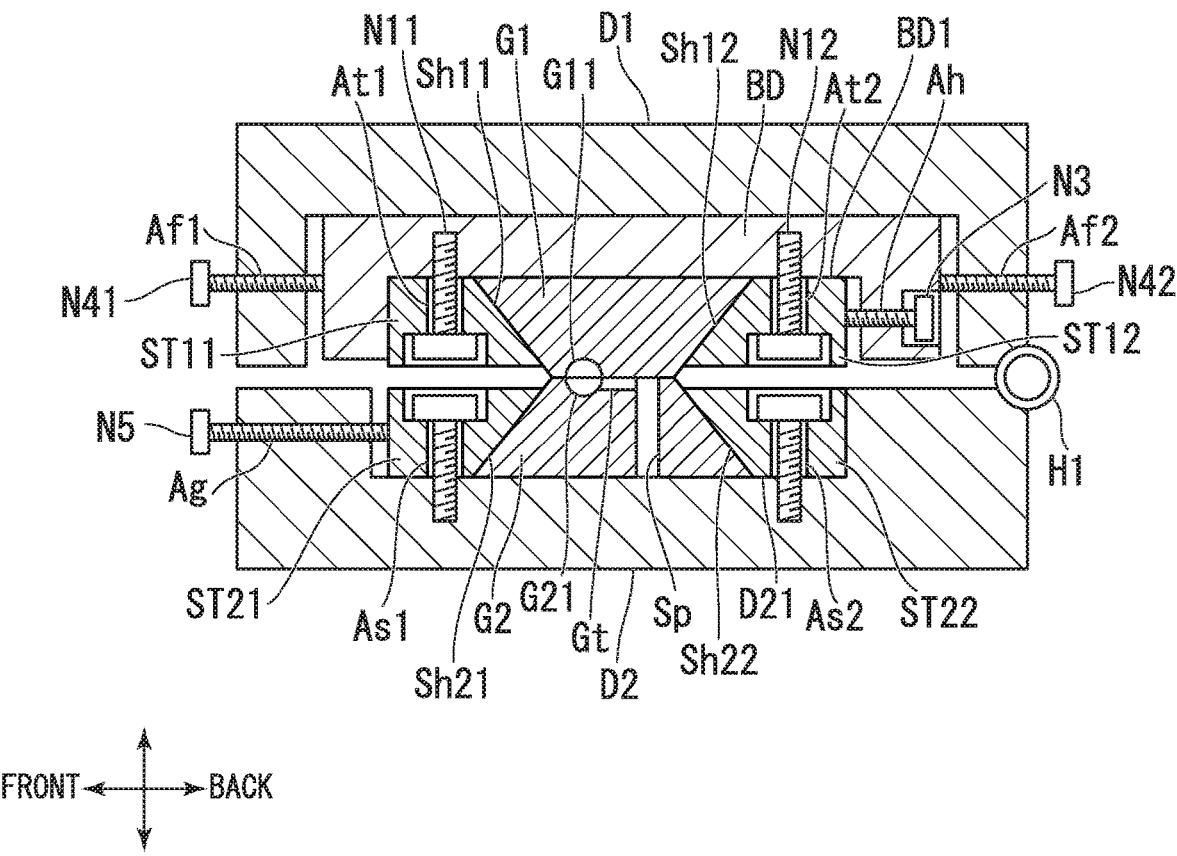
FIG. 4 is a schematic view showing a cross section of a glass opening-and-closing unit according to one embodiment of the invention.

As shown in FIGS. 1 and 4, the above-described glass opening-and-closing unit M1 includes a pair of glass members G1 and G2, a pair of mounting tables D1 and D2, the hinge H1, the adjustment base BD, a pair of first lateral pressing members ST11 and ST12, and a pair of second lateral pressing members ST21 and ST22.

As shown in FIGS. 2A, 2B, 3A, and 3B, the glass members G1 and G2 are formed in a trapezoidal shape in a cross section in a direction vertical to a mounting surface BD1 of the adjustment base BD and a mounting surface D21 of the mounting table D2 (refer to FIG. 4), and respectively have the grooves G11 and G21 which are used for re-coating and provided on the center portion of the short side of the trapezoidal shape, that is, on the center portions of the surfaces which are butt-jointed to each other. When the above-described forming members are butt-jointed to each other, the above-mentioned grooves G11 and G21 form a cavity having a substantially cylindrically-shaped air space.

Furthermore, the above-mentioned spool Sp and gate Gt in addition to the groove G21 are formed on the lower glass member G2.

The spool Sp is a flow passage in which a liquiform resin, that is, a pre-cured resin flows and which is penetrated in height direction, and one end thereof is connected to the short side of the aforementioned trapezoidal shape, that is, to the gate Gt formed on the center portion of the surface of the glass member G2 which is to be butt-jointed to the glass member G1. Moreover, the other end of the spool Sp which is opposite to said one end thereof connected to the gate Gt is connected to a resin supply (not shown in the figure) constituted of a pump or the like, and the resin that is to be supplied from the resin supply flows to the gate Gt.

The gate Gt is a groove formed on the short side of the trapezoidal shape, that is, on the center portion of the surface of the glass member G2 which is to be butt-jointed to the glass member G1, is connected to one end of the spool Sp, and is connected to the groove G21. The resin flows to the gate through the spool Sp. The resin flows toward a cavity formed by the grooves G11 and G21. In the cavity, re-coating the optical fiber is carried out by the resin flowing from the gate Gt thereinto.

The adjustment base BD is a base to which the upper glass member G1 is fixed, and is fixed on the upper mounting table D1; and the position thereof on the mounting table D1 in the front-back direction (direction from the front side to the back side) is adjusted by positioning screws N41 and N42 which will be described later.

Figure 3A:
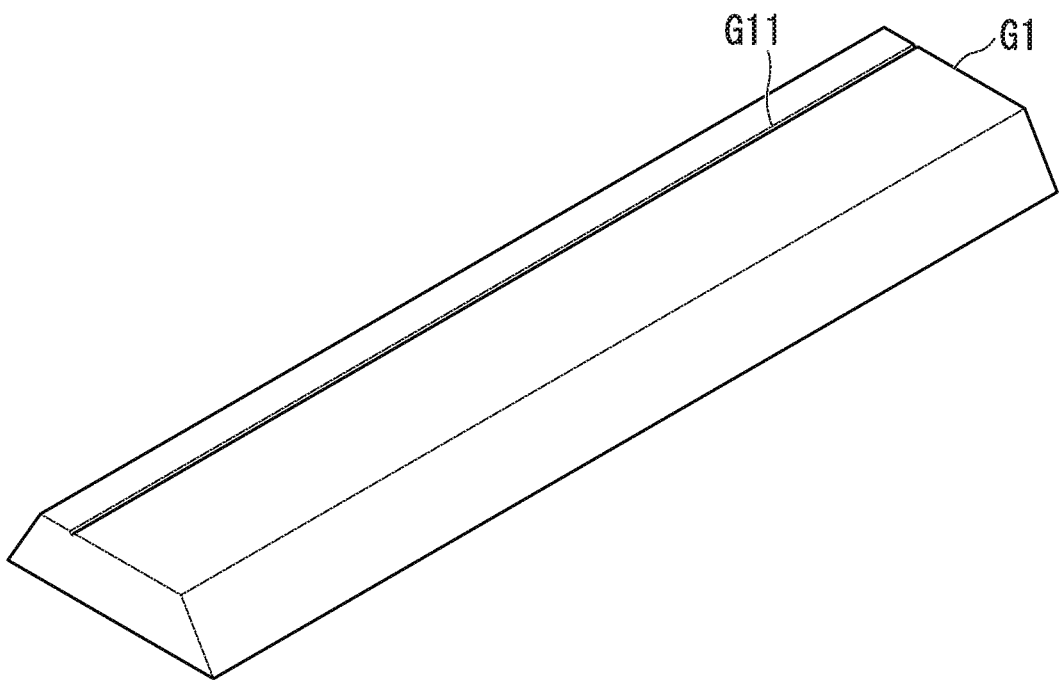
FIG. 3A is a perspective view showing an upper glass member according to one embodiment of the invention.
Figure 3B:
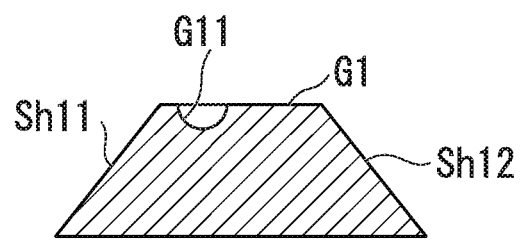
FIG. 3B is a cross-sectional view showing the upper glass member according to one embodiment of the invention.

The paired first lateral pressing members ST11 and ST12 are provided on the mounting surface BD1 of the adjustment base BD and are configured to have inclined surfaces which are to be respectively in surface contact with the two inclined surfaces Sh11 and Sh12 of the glass member G1 having the inclined sides of the trapezoidal shape in the above-described cross section of the upper glass member G1 (refer to FIGS. 3A and 3B). The upper glass member G1 is sandwiched between the paired first lateral pressing members ST11 and ST12 from the front side and the back side thereof.

Figure 2A:
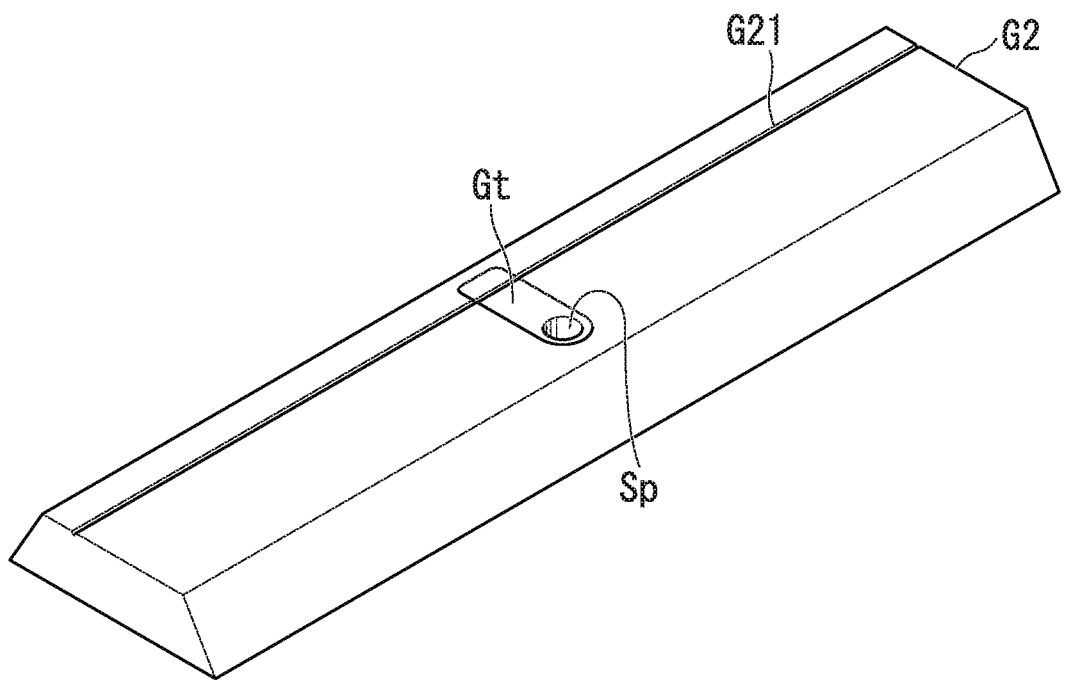
FIG. 2A is a perspective view showing a lower glass member according to one embodiment of the invention.
Figure 2B:
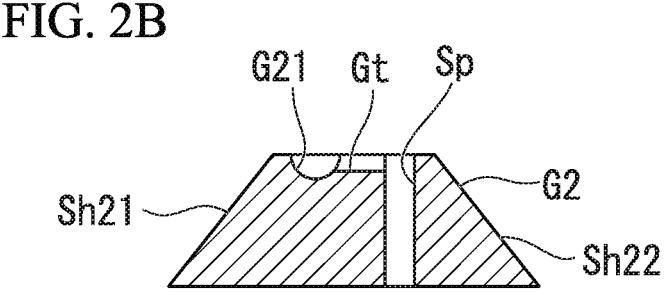
FIG. 2B is a cross-sectional view showing the lower glass member according to one embodiment of the invention.

The paired second lateral pressing members ST21 and ST22 are provided on the mounting surface D21 of the lower mounting table D2 and are configured to have inclined surfaces which are to be respectively in surface contact with the two inclined surfaces Sh21 and Sh22 of the glass member G2 having the inclined sides of the trapezoidal shape in the above-described cross section of the lower glass member G2 (refer to FIGS. 2A and 2B). The lower glass member G2 is sandwiched between the paired second lateral pressing members ST21 and ST22 from the front side and the back side thereof. Particularly, as shown in FIGS. 1 and 4, of the aforementioned front side and back side, the back side is the side at which the hinge H1 of the glass opening-and-closing unit M1 is provided. On the other hand, the front side is the side opposite to the back side.

For example, holes At1 and At2 for screw are provided along a direction vertical to the mounting surface BD1 of the adjustment base BD on the above-described paired first lateral pressing members ST11 and ST12, respectively. Additionally, on the mounting surface BD1 of the adjustment base BD, threaded holes are provided at the positions, on which the first lateral pressing members ST11 and ST12 are provided, so as to correspond to the holes At1 and At2 for screw of the above-described paired first lateral pressing members ST11 and ST12. The fixing screws N11 and N12 are respectively threadably fitted to the holes At1 and At2 for screw and the threaded holes provided on the adjustment base BD, and the adjustment base BD is thereby coupled to the above-described paired first lateral pressing members ST11 and ST12.

Figure 5:
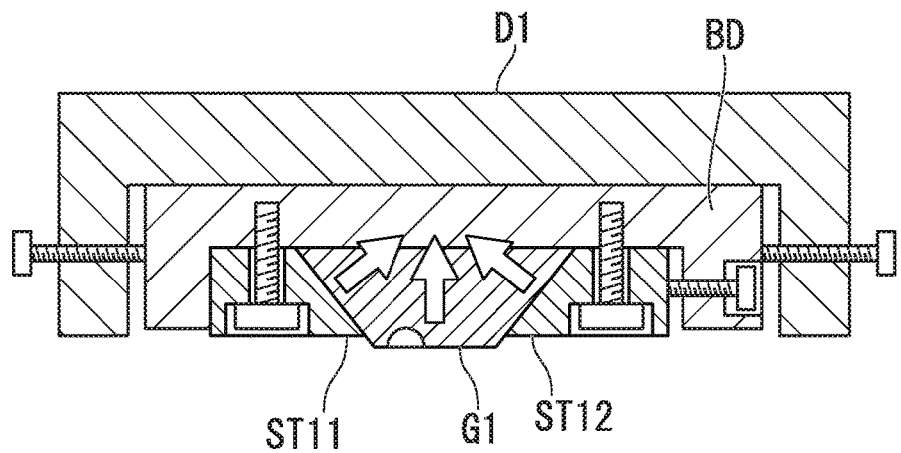
FIG. 5 is a schematic view showing an action of force applied to the upper glass member according to one embodiment of the invention.

Furthermore, the adjustment base BD is formed in a container shape such that the center portion thereof is depressed, and the inner bottom surface of the container is the mounting surface BD1. A threaded hole Ah is provided in the direction toward the first lateral pressing member ST12 and on the side surface of the adjustment base BD which is near the first lateral pressing member ST12 (back side). A lateral pressing screw N3 is screwed to the threaded hole Ah, and the first lateral pressing member ST12 is pressed against the upper glass member G1 by the shaft of the lateral pressing screw N3. In particular, since the screw hole At2 for screw of the first lateral pressing member ST12 is formed to be slightly looser than that of the peripheral surface of the shaft of the fixing screw N12, the first lateral pressing member ST12 pressed by the lateral pressing screw N3 presses the upper glass member G1. As a result, as shown in FIG. 5, the glass member G1 is pressed in the direction toward the upper mounting table D1 and thereby tightly fixed to the adjustment base BD.

Furthermore, the mounting table D1 is also is formed in a container shape such that the center portion thereof is depressed and accommodates the adjustment base BD in the container thereof. Threaded holes Af1 and Af2 are provided in the direction toward the adjustment base BD and on the two side surfaces of the mounting table D1 which are near the first lateral pressing member ST11 (front side) and the first lateral pressing member ST12 (back side). The positioning screws N41 and N42 are threadably fitted into the threaded holes Af1 and Af2, and the adjustment base BD is pressed by the positioning screws N41 and N42. As a result, the position of the adjustment base BD is adjusted on the mounting table D1 in the front-back direction (direction from the front side to the back side) is adjusted.

Moreover, holes As1 and As2 for screw are provided along a direction vertical to the mounting surface D21 of the lower mounting table D2 on the aforementioned paired second lateral pressing members ST21 and ST22, respectively. Additionally, on the mounting surface D21 of the lower mounting table D2, threaded holes are provided at the positions, on which the second lateral pressing members ST21 and ST22 are provided, so as to correspond to the holes As1 and As2 for screw of the above-described paired second lateral pressing members ST21 and ST22. The fixing screws N21 and N22 are respectively threadably fitted to the holes As1 and As2 for screw and the threaded holes provided on the lower mounting table D2, and the lower mounting table D2 is thereby coupled to the above-described paired second lateral pressing members ST21 and ST22.

Furthermore, the lower mounting table D2 is formed in a container shape such that the center portion thereof is depressed, and the inner bottom surface of the container is the mounting surface D21. A threaded hole Ag is provided in the direction toward the second lateral pressing member ST21 and on the side surface of the lower mounting table D2 which is near the second lateral pressing member ST21 (front side). A lateral pressing screw N5 is screwed to the threaded hole Ag, and the second lateral pressing member ST21 is pressed against the lower glass member G2 by the shaft of the lateral pressing screw N5. In particular, since the hole As1 for screw of the second lateral pressing member ST21 is formed to be slightly looser than that of the peripheral surface of the shaft of the fixing screw N21, the second lateral pressing member ST21 pressed by the lateral pressing screw N5 presses the lower glass member G2. As a result, the glass member G2 is pressed in the direction toward the lower mounting table D2 and thereby tightly fixed to the lower mounting table D2.

Figure 6A:
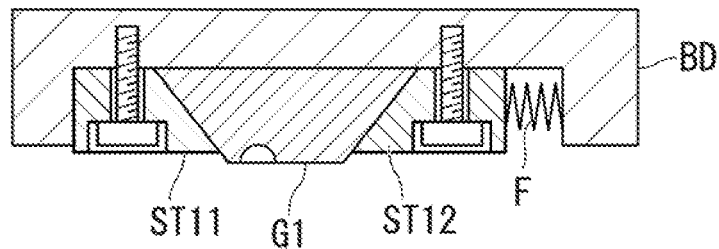
FIG. 6A is a schematic view showing a modified example of a glass opening-and-closing unit according to one embodiment of the invention.

In addition, regarding a modified example of the embodiment, as shown in FIG. 6A, by providing a force-applying means F such as a spring between the side surface of the adjustment base BD and the first lateral pressing member ST12 instead of the above-described lateral pressing screw N3, the first lateral pressing member ST12 may be pressed against the glass member G1 by the force-applying means F.

Figure 6B:
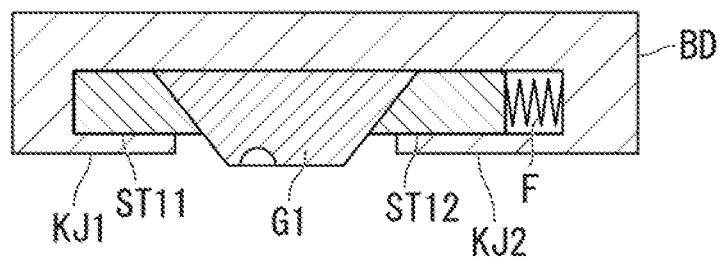
FIG. 6B is a schematic view showing a modified example of a glass opening-and-closing unit according to one embodiment of the invention.

Furthermore, regarding a modified example of the embodiment, as shown in FIG. 6B, without fixing the aforementioned first lateral pressing members ST11 and ST12 to the adjustment base BD by the fixing screws N11 and N12, sandwich-holding mechanisms KJ1 and KJ2 that holds the aforementioned first lateral pressing members ST11 and ST12 in the vertical direction may be provided in the adjustment base BD.

Figure 6C:
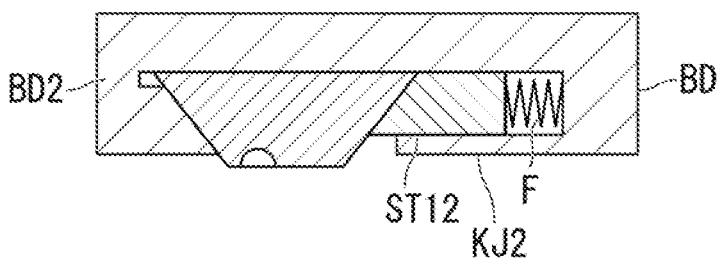
FIG. 6C is a schematic view showing a modified example of a glass opening-and-closing unit according to one embodiment of the invention.

Moreover, regarding a modified example of the embodiment, as shown in FIG. 6C, the upper glass member G1 is pressed only by the above-mentioned first lateral pressing member ST12, and a lateral pressing mechanism BD2 which is near the first lateral pressing member ST11 (front side) and which comes into surface contact with the inclined surface Sh11 of the upper glass member G1 may be provided in the adjustment base BD.

Figure 6D:
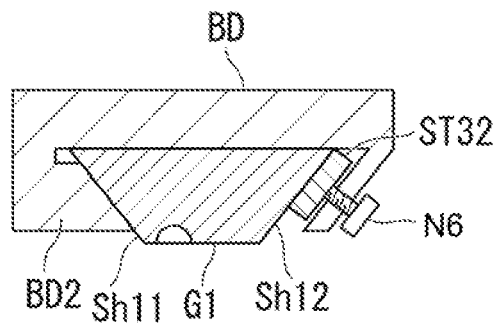
FIG. 6D is a schematic view showing a modified example of a glass opening-and-closing unit according to one embodiment of the invention.

Additionally, regarding a modified example of the embodiment, as shown in FIG. 6D, the first lateral pressing member ST32 having an inclined surface that comes into surface contact with the inclined surface Sh12 of the upper glass member G1 is provided instead of the first lateral pressing member ST12, the inclined surface Sh12 of the upper glass member G1 may be pressed in a direction vertical thereto toward the upper glass member G1 by the first lateral pressing member ST32 and by a lateral pressing screw N6 screwed to the adjustment base BD. Also, by preparing a first lateral pressing member that is the same as the first lateral pressing member ST32 and using the first lateral pressing member, the glass member G1 may tightly fixed to the adjustment base BD with respect to the inclined surface Sh11 of the upper glass member G1.

Particularly, the above-described fixing screws N11 and N12, N21, and N22, the lateral pressing screw N3, the positioning screws N41 and N42, the lateral pressing screw N5, and the lateral pressing screw N6 are not shown in FIGS. 4, 5, 6A, 6B, 6C, and 6D; however, a plurality thereof are provided in the width direction of the optical fiber re-coating device A.

According to the above-described embodiment, the paired glass members G1 and G2 are formed in a trapezoidal shape in the cross section in a direction vertical to the mounting surface BD1 of the adjustment base BD and the mounting surface D21 of the mounting table D2 (refer to FIG. 4), the grooves G11 and G21 are provided on the short side of the trapezoidal shape, the inclined surfaces Sh11, Sh12, Sh21, and Sh22 of the glass member including the inclined side of the trapezoidal shape are pressed, and the glass members G1 and G2 can thereby be fixed thereto without occurrence of warpage of the glass members G1 and G2 and without providing threaded holes the glass members G1 and G2.

Moreover, according to the embodiment, as described above, it is not necessary to provide threaded holes on the glass members G1 and G2. Consequently, since the glass members G1 and G2 can be downsized, it is possible to reduce the material cost of pure quartz.

Furthermore, according to the embodiment, as a result of reducing the size of the glass members G1 and G2, the rigidity in the glass members G1 and G2 is improved.

Additionally, according to the embodiment, as described above, since it is not necessary to provide threaded holes on the glass members G1 and G2 and grinding machining thereof with respect to the glass members G1 and G2 is not required, a damage to the glass members G1 and G2 is reduced, and the reliability thereof is improved.

Also, according to the embodiment, as described above, since it is not necessary to provide threaded holes on the glass members G1 and G2 and grinding machining therefor is not required, the processing cost is reduced and can be inexpensive.

In addition, according to the embodiment, the glass members G1 and G2 are not locally and directly pressed by the screws, and a localized deformation of the glass members G1 and G2 does not occur.

Moreover, according to the embodiment, as a result of precisely polishing the mounting surface BD1 of the adjustment base BD, the mounting surface D21 of the mounting table D2, and the bottom surface of the glass members G1 and G2, it is possible to further reduce warpage of the glass members G1 and G2.

Additionally, according to the embodiment, since the glass members G1 and G2 are tightly fixed onto the mounting surface BD1 of the adjustment base BD and the mounting surface D21 of the mounting table D2, respectively, it is possible to reduce displacement of the glass members G1 and G2 due to impact during operation of opening and closing the glass opening-and-closing unit M1.

An embodiment of the invention is described above; however, the invention is not limited to the above-mentioned embodiment, for example, the following modification may be considered.

(1) In the above-mentioned embodiment, both the paired glass members G1 and G2 are formed in a trapezoidal shape in the cross section and are fixed onto the mounting surface BD1 of the adjustment base BD and the mounting surface D21 of the mounting table D2, respectively, due to the inclined surfaces Sh11, Sh12, Sh21, and Sh22 being pressed; however, it is only necessary that at least one of the paired glass members G1 and G2 is formed in a trapezoidal shape in the above-mentioned cross section and is fixed onto the mounting surface due to the inclined surface thereof being pressed.

Moreover, both the glass members G1 and G2 are formed in a trapezoidal shape in cross section having two inclined sides; however, it may not be formed in a trapezoidal shape having two inclined sides, it may be formed in a trapezoidal shape having one inclined side and the other side that is a straight line vertical to a bottom side, and a lateral pressing member may be provided on the inclined surface having said one inclined side. In this case, it is only necessary to allow the side surface of the adjustment base BD to come into contact with the flat surface including the straight line vertical to the bottom side of the trapezoidal shape. Also, the present invention is not limited to the aforementioned trapezoidal shape as long as the above-described cross section is formed in a shape having a side inclined with respect to the mounting surface BD1 of the adjustment base BD or the mounting surface D21 of the mounting table D2.

(2) In the above-mentioned embodiment, the lateral pressing screws N3, N5, and N6 directly press the first lateral pressing member ST12, the second lateral pressing member ST22, and the first lateral pressing member ST32; however, plate-shaped members are provided: between the lateral pressing screws N3 and the first lateral pressing member ST12; between the lateral pressing screws N5 and the second lateral pressing member ST22; and between the lateral pressing screws N6 and the first lateral pressing member ST32, and pressing forces of the lateral pressing screws N3, N5, and N6 may be entirely applied to the first lateral pressing member ST12, the second lateral pressing member ST22, and the first lateral pressing member ST32.

DESCRIPTION OF REFERENCE NUMERAL

A . . . optical fiber re-coating device, M . . . optical fiber coater, K . . . optical fiber holder, M1 . . . glass opening-and-closing unit, G1, G2 . . . glass member, D1, D2 . . . mounting table (base), H1 . . . hinge, Sp . . . spool, Gt . . . gate, ST11, ST12 . . . first lateral pressing member, ST21, ST22 . . . second lateral pressing member, At1, At2 . . . hole for screw, N11, N12 . . . fixing screw, As1, As2 . . . hole for screw, N21, N22 . . . fixing screw, Ah . . . threaded hole, N3 . . . lateral pressing screw, Af1, Af2 . . . threaded hole, N41, N42 . . . positioning screw, Ag . . . threaded hole, N5 . . . lateral pressing screw, Sh11, Sh12 . . . inclined surface, Sh21, Sh22 . . . inclined surface, BD . . . adjustment base, F . . . force-applying means, KJ1, KJ2 . . . sandwich-holding mechanism, BD2 . . . lateral pressing mechanism, ST32 . . . first lateral pressing member, N6 . . . lateral pressing screw

The invention claimed is:

1. An optical fiber re-coating device comprising an optical fiber coater that cures resin and coats a coating-removed portion of an optical fiber therewith, the optical fiber coater comprising:
a pair of glass members each having a groove formed thereon; and
two bases on which the respective glass members are provided, wherein
a hollow that is used to coat the optical fiber is formed by matching the grooves of the pair of glass members,
at least one of the pair of glass members is formed in a trapezoidal shape in a cross section in a direction vertical to mounting surfaces of the bases,
the groove on the at least one of the pair of glass members is provided on a short side of the trapezoidal shape,
an inclined surface of the at least one of the pair of glass members including an inclined side of the trapezoidal shape is pressed, and the at least one of the pair of glass members is thereby fixed to a base of the bases,
the optical fiber coater further comprises a lateral pressing member that has an inclined surface that comes into surface contact with the inclined surface of the at least one of the pair of glass members,
the lateral pressing member corresponds to at least one of two inclined surfaces, including the inclined surface of the at least one of the pair of glass members, and is provided on the base, and
the optical fiber coater further comprises:
a first force-applying member that presses the lateral pressing member to the at least one of the pair of glass members in a first direction that is perpendicular to contacting surfaces of the at least one of the pair of glass members and the base, and
a second force-applying member that presses the lateral pressing member to the at least one of the pair of glass members in a second direction that is different from the first direction.

2. The optical fiber re-coating device according to claim 1, wherein
each of the pair of glass members is formed in a trapezoidal shape in a cross section in a direction vertical to the mounting surfaces of the bases, and
an inclined surface of each glass member including an inclined side of the respective trapezoidal shape is pressed, and each glass member is thereby fixed to each base.

3. The optical fiber re-coating device according to claim 1, wherein,
the lateral pressing member corresponds to the at least one of the two inclined surfaces of the at least one of the pair of glass members, and is provided on at least one of the mounting surfaces of at least one of the bases.

4. The optical fiber re-coating device according to claim 1, wherein
the first force-applying member is a first screw, and
a longitudinal axis of the first screw extends through the lateral pressing member to the base in the first direction.

5. The optical fiber re-coating device according to claim 1, wherein
the first force-applying member is a sandwich-holding mechanism, and
the lateral pressing member is sandwiched between the sandwich-holding mechanism and the base in the first direction.

6. The optical fiber re-coating device according to claim 1, wherein
the second force-applying member is a second screw, and
a longitudinal axis of the second screw extends through the base to the lateral pressing member in the second direction, and wherein the second direction that is perpendicular to the first direction.

7. The optical fiber re-coating device according to claim 1, wherein
the second force-applying member is a spring that is provided between the base and the lateral pressing member in the second direction, and wherein the second direction that is perpendicular to the first direction.

8. An optical fiber re-coating device comprising an optical fiber coater that cures resin and coats a coating-removed portion of an optical fiber therewith, the optical fiber coater comprising:
a pair of glass members each having a groove formed thereon; and
two bases on which the respective glass members are provided, wherein
a hollow that is used to coat the optical fiber is formed by matching the grooves of the pair of glass members,
at least one of the pair of glass members is formed in a trapezoidal shape in a cross section in a direction vertical to mounting surfaces of the bases,
the groove on the at least one of the pair of glass members is provided on a short side of the trapezoidal shape,
an inclined surface of the at least one of the pair of glass members including an inclined side of the trapezoidal shape is pressed, and the at least one of the pair of glass members is thereby fixed to a base of the bases,
the optical fiber coater further comprises a lateral pressing member that has an inclined surface that comes into surface contact with the inclined surface of the at least one of the pair of glass members, the lateral pressing member corresponds to at least one of two inclined surfaces, including the inclined surface of the at least one of the pair of glass members, and is provided on the base, and the optical fiber coater further comprises a force-applying member that presses the lateral pressing member to the inclined surface of the at least one of the pair of glass members in a direction that is perpendicular to the inclined surface of the at least one of the pair of glass members.

9. The optical fiber re-coating device according to claim 8, wherein the force-applying member is a screw, and a longitudinal axis of the screw extends through the base to the lateral pressing member in the direction that is perpendicular to the inclined surface of the at least one of the pair of glass members.

* * * * *